Feb. 7, 1961    H. A. FETTER    2,970,701
HOLDER ON UPRIGHT SUPPORT OF DETACHABLE ROTATABLE TRAYS
Filed Jan. 27, 1960
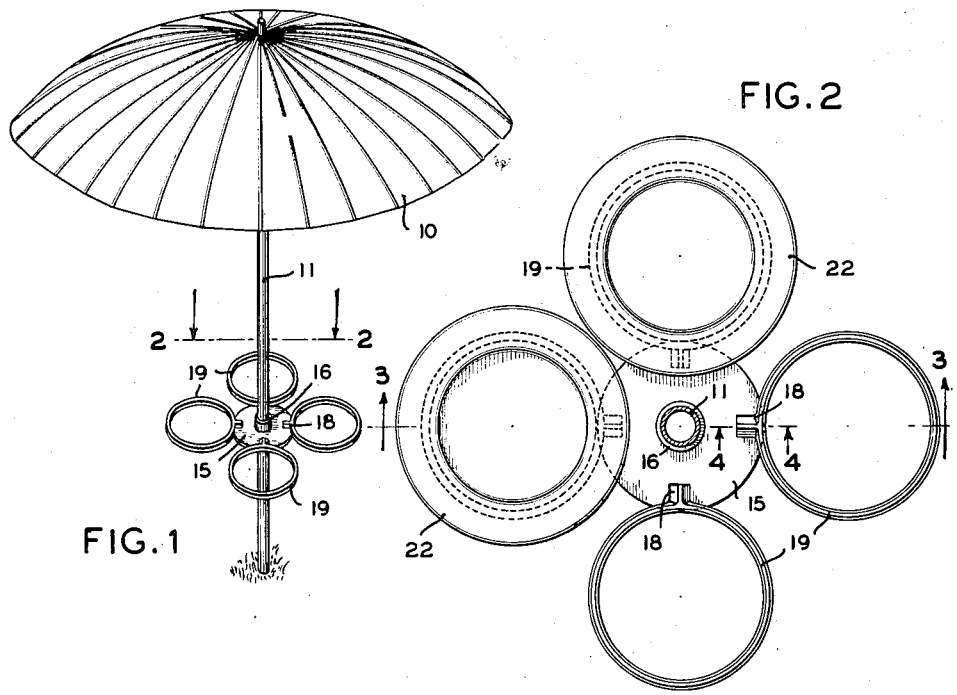
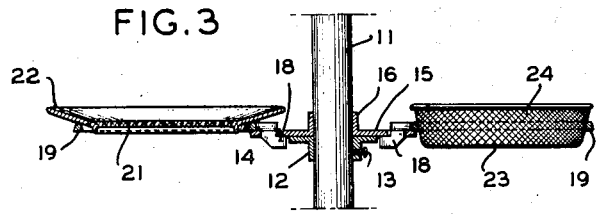
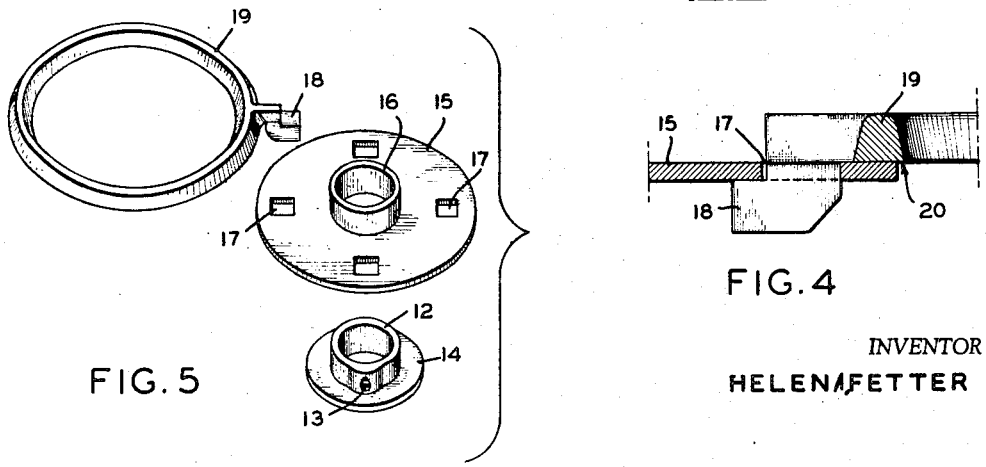
INVENTOR
HELEN A. FETTER
BY
ATTORNEY United States Patent Office 2,970,701
Patented Feb. 7, 1961

2,970,701

HOLDER ON UPRIGHT SUPPORT OF DETACHABLE ROTATABLE TRAYS

Helen A. Fetter, 470 Gulfview Blvd., Clearwater Beach, Fla.

Filed Jan. 27, 1960, Ser. No. 4,994

1 Claim. (Cl. 211—78)

This invention relates to the serving or dispensing of foods, beverages and other objects of various kinds and including at beaches, on lawns, and at other places, and to equipment employed for the holding of such foods, beverages and other objects in a manner that they will be readily accessible and within convenient reach at all times.

The invention relates particularly to holders for objects of various kinds which can be used in connection with beach umbrellas and beach tables for supporting trays, dishes, baskets or the like for holding objects of various kinds at a convenient height and location for ready access.

Various devices have been provided for holding refreshments or other objects including trays or containers for tidbits or the like but these usually have been complicated, bulky, expensive and easily upset and otherwise unsatisfactory.

It is an object of the invention to provide holding or supporting means for trays or containers of refreshments or the like and of a character to be mounted on an upright such as the handle of an umbrella or other post or umbrella-shaded tables and including general lazy Susan type structure and rendering a series of trays or object holders readily accessible by the mere rotation of the structure on its support.

Another object of the invention is to provide a dinner plate tray or basket supporting apparatus for mounting a series of detachable rings on a central rotatable mounting plate with the rings and the mounting plate having interlocking parts so that the ring may be rotated therewith or may be detached therefrom, and with a supporting collar for such mounting plate which collar can be fastened to an umbrella handle or post upon which the device is desired to be mounted.

A further object of the invention is to provide a mounting plate having openings therein for the receipt in each of the complementary lugs a detachable ring for removably supporting a basket, tray dinner plate or other container or the like and which plate includes an integral hub of substantial length providing extended contact with a supporting post sufficiently that the plate will be relatively stable although rotatable and with a collar with an outwardly extending flange to provide a relatively large supporting surface for such plate and with said collar having a set screw for attachment to a post.

Other objects and advantages of the invention will be apparent from the following description taken in conjunction with the accompanying drawings wherein:

Fig. 1 is a perspective of the invention applied to a beach umbrella;

Fig. 2, a horizontal section on the line 2—2 of Fig. 1;

Fig. 3, a section on the line 3—3 of Fig. 2;

Fig. 4, an enlarged fragmentary section on the line 4—4 of Fig. 2; and

Fig. 5, an exploded perspective illustrating the relation of the parts.

Briefly stated, the present invention is a device for mounting trays, baskets, dinner plates or the like for food and drink and which device comprises a mounting collar having a set screw for locking the same in position and with an outwardly extending flange which forms a support for a rotatable plate or disk having equally spaced recesses or openings for the detachable reception of the complementary lugs on rings which have flat engaging surfaces and which device is particularly useful for the serving of food and drinks around lounging areas such as beaches, lawns, and the like where umbrella shaded tables are found, and with such device mounted on center posts which sometimes project through beach or lawn tables and where persons lounging nearby may partake of the contents of the receptacles.

With continued reference to the drawings, a beach umbrella 10 has a handle 11 by means of which the umbrella may be held in an upright position either collapsed or extended. The present invention is adapted to be mounted on a post or handle such as the handle 11 and for this purpose a locking collar 12, Fig. 5, is adapted to be fixed to the handle by means of a set screw 13.

The collar 12 has a lateral flange 14 disposed at right angles to the axis of the collar and this flange serves as a support for a mounting plate 15 having a hub or sleeve portion 16 to provide extended contact with the post to which the device is applied yet permitting the mounting plate 15 to rotate freely.

The mounting plate is provided with a series of rectangular recesses or openings 17, each with one side close to the outer periphery of the mounting plate and being adapted to receive complementary lugs 18 of detachable holder rings 19, said lugs each having a first portion for disposition downwardly at right angles to the plate and a second hook-forming portion at right angles to the first portion for disposition beneath and substantially paralleled to the plate, the remote or second portion of each lug being extended in a direction opposite that of the ring and being spaced from the ring a distance slightly greater than the thickness of the mounting plate so that the ring may fit solidly against the mounting plate when the holder rings are applied. Since the lugs of the holder ring extend away from the ring, the holder rings may be applied to the plate and remain in position due to the complementary portions of the recesses and lugs until the rings are raised and the lugs 18 removed from the recesses 17 in the plate 15, each ring having a flat bottom surface 20 which engages the plate 15 to provide a solid mounting for such plate.

The mounting plate and rings carried by it can be adjusted lengthwise of the post 11 by the mere loosening of the set screw 13 adjusting the device to the desired elevation and then tightening such set screw. Also the free rotation of the plate 15 with the rings 19 carried by it enables the device to be turned to the desired position for ready access thereto.

The rings 19 may removably support objects such as a dinner plate having a shallow receptacle forming portion 21 and an upwardly inclined annular marginal flange 22 or they may removably support a shallow basket having a bottom 23 and an inclined annular wall 24.

It will be apparent from the foregoing that a relatively simple and inexpensive device is provided for supporting from a post or umbrella handle a plate with a series of detachable rings and in which may be disposed receptacles such as dinner plates, baskets or the like.

It will be obvious to one skilled in the art that various changes may be made in the invention without departing from the spirit and scope thereof and therefore the invention is not limited by that which is illustrated in the drawings and described in the specification, but only as indicated in the accompanying claim.

What is claimed is:

A device for rotatably supporting a series of holders at different elevations and rotational positions comprising a collar of a size and shape to fit about an upright member such as the shaft of a beach-type umbrella, a set screw carried by said collar for securing the latter in fixed position on said upright member, said collar having at its upper end an outwardly extending annular flange forming with said collar a smooth upper surface on which a mounting plate is adapted to rest, a mounting plate rotatably supported on said flange and comprising a collar and an outwardly extending relatively thin annular flange with a series of rectangular openings each having one of its sides close to the outer periphery of the mounting plate, a series of holder rings having depending lugs of a size and configuration to be complementarily received within said rectangular openings and with hook portions extending away from and spaced from said rings a distance corresponding to the thickness of the flange of said mounting plate, the weight of said holder rings maintaining them in fixed relation to the mounting plate but permitting them to be readily detached, said mounting plate collar providing an extended bearing surface for contact about an upright member for permitting free rotation thereof on said mounting flange, said holder rings being adapted to removably receive holding receptacles.

References Cited in the file of this patent

UNITED STATES PATENTS

| | | |
|---|---|---|
| 44,447 | O'Donnell | Sept. 27, 1864 |
| 150,320 | Hills | Apr. 28, 1874 |
| 172,339 | Patterson | Jan. 18, 1876 |
| 351,578 | Colburn | Oct. 26, 1886 |
| 1,006,513 | Tyreman | Oct. 24, 1911 |